Aug. 18, 1959  J. G. BAKER  2,899,862
SIGHTING INSTRUMENT OPTICAL SYSTEM
Filed Feb. 20, 1956                    2 Sheets-Sheet 1
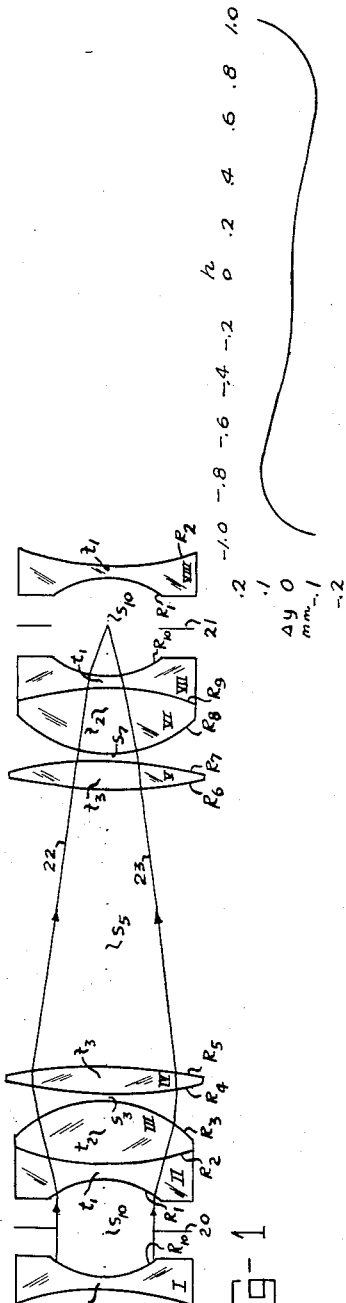
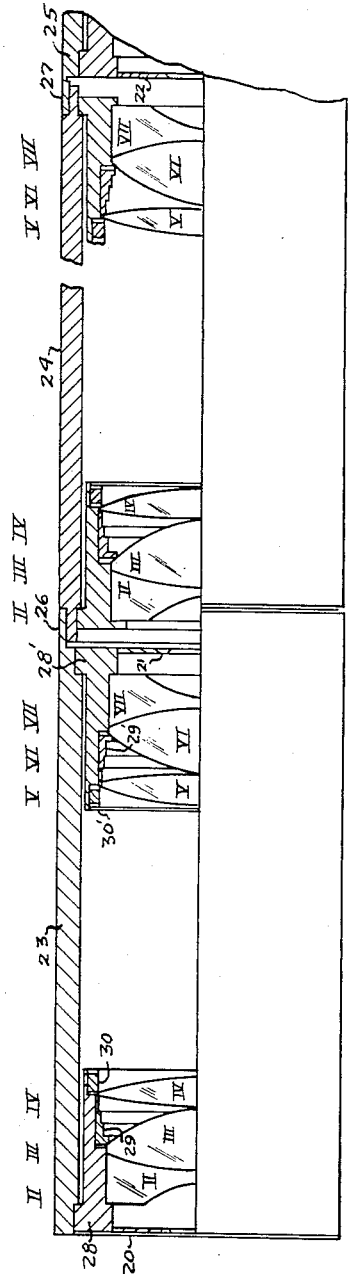
INVENTOR.
JAMES G. BAKER
BY
ATTORNEYS Aug. 18, 1959  J. G. BAKER  2,899,862
SIGHTING INSTRUMENT OPTICAL SYSTEM
Filed Feb. 20, 1956  2 Sheets-Sheet 2
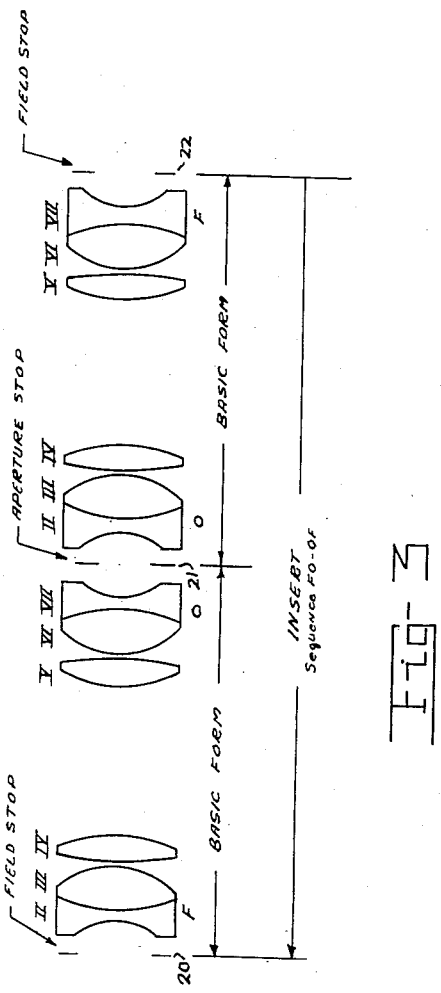
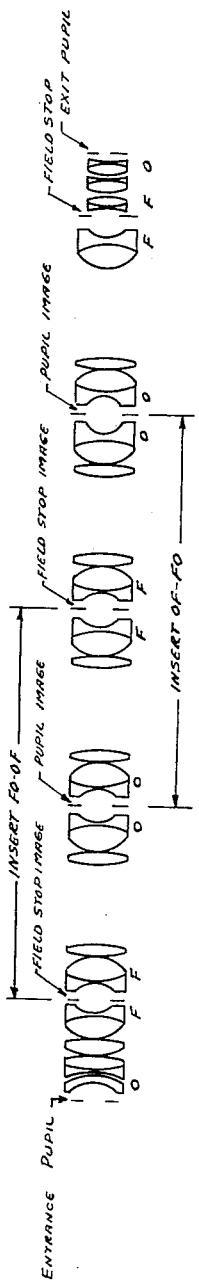
INVENTOR.
JAMES G. BAKER
BY
ATTORNEYS United States Patent Office 2,899,862
Patented Aug. 18, 1959

2,899,862

SIGHTING INSTRUMENT OPTICAL SYSTEM

James G. Baker, Winchester, Mass., assignor to the United States of America as represented by the Secretary of the Air Force Application February 20, 1956, Serial No. 566,740

11 Claims. (Cl. 88—57)

This invention relates to sighting instrument optical systems and more particularly to an improved imaging optical system characterized by optimum aberration control for lengthening systems in sighting instruments, such as telescopes, periscopes and the like.

As a background for insuring a sufficient understanding of the present invention as claimed, in the field of optical sighting systems in instruments of the telescope and the periscope type, it is desirable in aircraft installations that the instruments be lengthened without objectionably changing their optical performance. Sighting instrument optical systems comprise two distinct groups of lenses, an objective lens group and an eyepiece or an ocular lens group. Light from an object under scrutiny at the focal plane of an objective lens or group of lenses, is transmitted by the lenses and forms a real image of the object at the image plane of the lenses. The real image formed by the objective lens group is viewed by an eyepiece or an ocular lens group which magnifies the image. The ocular or eyepiece lens group comprises a field lens and an eye lens and hence also may be designated as a field lens group. The field lens is near the image than the eye lens is. The field lens deviates inwardly into the eye lens the cone of light rays converging towards each point of the image. Within the instrument, stops provide openings at the image planes of the lens groups and these stop openings restrict transmitted light to that passing the stop. The ocular lens group forms an image of a previous stop opening in the ocular lens group focal plane, or in extended systems in a succeeding stop image plane. Entrance and exit pupils respectively admit light to and emit light from the instrument. The eyepiece or ocular lens group controls the cone of light rays which passes through an instrument tube of restricted diameter while it preserves the imaging properties of the optical system. This control by the objective and the ocular lens groups is advantageously rather thoroughly overlapping in function, resulting in a simultaneous control of those aberrations which are present in the instrument optical systems. Commonly recognized optical system lens aberrations include astigmatism, coma, longitudinal or axial chromatic lateral or transverse chromatic, distortion, field curvature, spherical aberrations, etc. All of these aberrations are minimized in the optical system which is contemplated hereby and in which vignetting is completely absent. Probably the most troublesome of these aberrations in periscopes, telescopes and the like, is that of curvature of field. In the instrument optical system which is disclosed herein, the curvature of field aberration is controlled by introducing negative lens curvatures without appreciably reducing the intensity of the transmitted image. The present optical system also uses symmetry of construction to be free from aberrations of coma, distortion and lateral chromatics. The present optical system also maintains optical symmetry within individual inserts, between successive inserts and generally by using pairs of symmetrical inserts. The preferred optical system is characterized by a flat field, large pupils, freedom from image aberrations and by parallel or collimated light rays. An increase in the length of a periscopic instrument, while preserving the field of view and the intensity of the transmitted image, is accomplished by the use of one or more of the optical insert units contemplated hereby in the optical system of the instrument. Representative texts applicable to the subject hereof are: "Recent Advances in Optics" by E. H. Linfoot, published in 1955 by the Oxford University Press, London, England; "Optics" by F. W. Sears, published in 1949 by the Addison-Wesley Press, Inc., Cambridge, Massachusetts; and "Light" by G. S. Monk, published in 1937 by McGraw-Hill Book Company, Inc., New York city, New York.

A general statement of the nature and of the substance of the present invention and commensurate with the invention as claimed and coextensive therewith, is that the nature of the present invention is to provide a new and improved imaging optical system whereby optical systems of sighting instruments may be lengthened with minimized objectionable aberrations. The substance of the present invention is a group of specifically spaced and defined lenses, reversibly positionable in multipliable basic forms to provide sighting instrument inserts of desired optical base lengths.

A general statement object of the present invention, as claimed, is to provide a new and an improved lens group applicable in desired multiples to optical systems of sighting instruments to impart desirable lengths thereto with minimized objectionable aberration characteristics.

Further objects of the present invention are to provide a separate, relatively simple optical system of three lenses which can be interposed one or more times in both direct and in inverted order, in symmetrical inserts in a sighting instrument optical system or the like, and in preferred combinations thereof to provide a desired optical length which is well corrected for all aberrations, or which make aberrations inappreciable in the instrument final image presentation. The resultant instrument is characterized by a large exit pupil which is adequate for two-eye vision if desired, with large eye relief, with a large real field and with a slightly negative Petzval sum which provides an overcorrected field of curvature of about two meters. The objects contemplated hereby include double barreled periscopes for binocular vision. All of the optical systems contemplated hereby are of orthoscopic and of aplanatic quality and are entirely free from objectionable characteristics commonly associated with previously produced periscopes, telescopes and the like.

A lens group which embodies the present invention is illustrated in various arrangements in the accompanying drawings, with the details of their curvatures, spacings and the like presented in chart form hereinafter.

In the drawings:

Fig. 1 is the diagrammatic, axial elevational view of a basic form of two mirrored lens groups embodying the present invention;

Fig. 2 is a fragmentary elevational view of a tube with a quadrant cut away for a diagrammatic view, partly in section, of a plurality of lens groups shown in Fig. 1;

Fig. 3 is a diagrammatic, axial elevational view of four sets of the lens groups in Fig. 1 arranged in two mirrored groups as basic forms in the insert shown;

Fig. 4 is a diagrammatic axial elevational view of a plurality of inserts in a sighting instrument; and Fig. 5 is an oblique spherical aberration curve of the performance of the system contemplated hereby.

The lens group shown in Fig. 1 of the accompanying drawings comprises a first group of four lenses designated by the reference symbols I to IV, inclusive, in axial alignment with a second mirror group of duplicate lenses inverted in order and designated by the reference numerals V to VIII, inclusive.

Each lens group is made up of arrangements of three lenses comprising a spherical aberration eliminating achromatic combination of a convergent and a divergent pair of lenses II and III cemented together over contacting surfaces of matching curvature as a doublet compound lens, and a convergent double convex lens IV. The axial thickness of the three lenses is designated by the lower case letter $t$, with $t_1$ indicating the axial thickness of the lens II, $t_2$ indicating the axial thickness of the lens III, and $t_3$ indicating the axial thickness of the lens IV. The radii of curvature of the lens optically functioning surfaces are indicated by the upper case letter R.

Let it be assumed in Fig. 1 that the pupil of the left stop 20 is the entrance pupil, then the pupil of the right stop 21 is the exit pupil and the right stop 21 is the field stop. The lens arrangement is symmetrical and is reversible in function. The axial air spaces between lens surfaces are indicated by the upper case letter S. Reference numerals accompanying the letters $t$, R and S on the drawings conform with values so identified in the chart below. Lens surfaces convex from the left have radii which are positive quantities or the lens surfaces are indicated as being of positive curvature. Lens surfaces which are concave from the left have radii which are negative quantities and hence are indicated as being of negative curvature. The term "absolute value" used herein may be taken as being real numerical values irrespective of sign.

In Fig. 1 a principal or chief beam is indicated by the lines 22 and 23, upon which light passage direction indicating arrow heads appear. The lines 22 and 23 indicate a bundle of light rays which are collimated between the lenses I and II, which are divergent through the lenses II and III and which converge at an illustrative angle of 31° through the mirrored lenses V, VI and VII to meet at the center of the pupil of the stop 21.

The three lenses in Fig. 1 are symmetrically arranged along their optical axes in two groups of four lenses each, for the purposes of inversion or for functional identity, with light entering either end of the system in Fig. 1. The system in Fig. 1 is fully corrected for spherical aberration, for astigmatism and for longitudinal color and is properly balanced for residual errors in both aperture and field. In the system in Fig. 1 the Petzval sum actually is slightly negative, which serves to produce an overcorrected field of curvature.

An experimental model sighting instrument, which embodies the present invention, has a large pupil size of 3.150 inches diameter, a tube diameter of 6.5 inches and an overall length of 18 inches. The optical, the equivalent, or the effective system focal length is 6.102 inches or about one-third of the real length of 18.000 inches between the first focal plane and the stop image plane of the system. The contemplated optical system lies between in succession a real focal plane and a real stop image plane, separated between about 1.5 and 4 times the equivalent focal length of the system. The lens groups adjacent to either plane are negative in power, whether the lens groups are simple or compound. The optical power of the elements between these negative groups is positive, whether the elements are simple or compound. Of the lenses in the experimental model, dense barium crown glass is designated DBC-3 and dense flint glass is designated DF-2 as cited on page 40 of Handbook of Photography by Henney and Dudley, published in 1939 by McGraw-Hill Book Company, Inc., New York city, New York and with $n_D$ index for sodium lines at page 444 in Monk and elsewhere. A stop limits the diameter of a bundle of light rays or defines the periphery of a beam of light passing from an object to a lens. In photographic lens systems the terms diaphragm stop, field stop, aperture stop, real stop, etc. are commonly used. The term "insert" indicates the present invention may be used in optical systems for extending the overall length without marked deterioration of image quality. The invention "basic form" is two mirrored lens groups, as is shown in Fig. 1, with two basic form groups shown in Fig. 3. The term "equivalent focal length" refers to the focal length of a system referenced to the focal length of a lens.

The pupil diameter of 3.150 inches is adequate for two eye observation, since interpupillary distance varies from about 2.2 to 2.8 inches for different observers. It may be presumed that a pupil diameter of at least 3.15 inches accommodates the rotation of a pair of human eyes in their sockets during field scanning without requiring head movements by an observer. The lens system has a ratio of aperture diameter to lens focal length of, or a speed of $f/1.935$, which is an extremely fast lens, since the required time of exposure increases with the square of the $f$ number. The stops 20 and 21 provide apertures for limiting the light rays that can be transmitted through the instrument. An aperture stop limits the quantity of transmitted light and a field stop controls the field of view.

The experimental model sighting instrument optical system which is represented in Fig. 1 of the drawings comprises an arrangement of the three lenses II, III and IV, with the following dimensions in inches of radial diameters, radial curvatures, axial dimensions, axial spacings, etc. by individual lenses:

[Focal length 6.102 inches for overall length of 18.000 inches. $f/1.935$. Field 30.71 degrees.]

| Surface | Radius (inches) | Thickness Glass | Thickness Air | Glass type | Edged Diameter (inches) |
|---|---|---|---|---|---|
| (1) | −2.637 | 0.351 | | DF-2 | 5.700 |
| (2) | 8.639 | 1.942 | | DBC-3 | 5.700 |
| (3) | −4.031 | | 0.145 | | |
| (4) | 24.768 | 0.852 | | DBC-3 | 6.400 |
| (5) | −9.967 | | 8.416 | | |
| (6) | 9.967 | 0.852 | | DBC-3 | 6.400 |
| (7) | −24.768 | | 0.145 | | |
| (8) | 4.031 | 1.942 | | DBC-3 | 5.700 |
| (9) | −8.639 | 0.351 | | DF-2 | 5.700 |
| (10) | 2.637 | | [1] 1.502 | | |

[1] Distance from the vertex of last surface to plane of pupil. Likewise, the entrance pupil or object plane, when used as erector, lies 1.502 inches before the vertex of the first lens surface.

The experimental model is characterized by large pupils, large eye relief and a large real field, as previously stated. No known periscopic system has existed previously with an exit pupil which is sufficiently large for convenient observation with both eyes without head movement. The system is fully corrected for spherical aberration, astigmatism and longitudinal color with the satisfactory balancing of residual errors in the aperture and in the field. The Petzval sum actually is slightly negative to produce an overcorrected field of curvature. The model provides a most comfortable two-eye vision at a fixed eye lens accommodation as the eyes sweep over a field. In viewing an image the eyepiece of the system is focused for a 2 meter image distance to match the field curvature.

The system represented in Fig. 1 of the accompanying drawings shows but one single complete basic form or functionally individual set of six lens elements in mirror image groups of 3 lenses each between the stops 20 and 21. The basic form of two identical lens groups provides a system which works equally well with a light from an object entering from either end of the system remote from the end at which an image of the object is observed. If the pupil defined by the aperture in the stop 20 at the left of the system in Fig. 1 be considered as the entrance pupil, then the pupil defined by the aperture in the stop 21 at the right end of the system in Fig. 1 is the field stop or is the ocular lens end of the system.

The basic form of six lens elements in mirror groups of three lenses each may be arranged on a common axis a desired number of times, as indicated in Fig. 2 of the accompanying drawings, wherein lens and stop designations of Fig. 1 appear. The assembly is housed suitably, as in tube sections 23, 24, 25, etc., making light-tight end connections with each other by axially overlapping joints 26, 27, etc. which may be slip joints, threaded joints or the like, as preferred. The lenses are accurately and securely positioned within the tubes in a usual manner by means of suitable lens mounts 28, 29, 30, etc., which may be slip or threaded in place for precision of adjustment and which may be spring loaded or not as preferred, within the conception of the present invention.

In Fig. 3 is shown a lens and stop arrangement of two basic forms as an insert, retaining the lens and stop designation of Fig. 1 and represented in two tube sections in Fig. 2. In Fig. 3 the first group of three lenses to the left is designated by the letter F for field group and a duplicate lens group in inverted order is designated by the letter O for objective group, providing a first FO basic form which consists of a field group of lenses which transmits light energy in common with an objective group of lenses. The second group of three lenses to the right of Fig. 3, in a similar way is designated as an OF basic form so that the insert is in a basic form sequence designated as FO—OF.

A system of four basic forms is represented in Fig. 4 of the accompanying drawings inserted inside an intrinsically inverting system. In Fig. 4 inserts of sequences FO—OF and of sequence OF—FO are indicated by labels in the drawings as also are the entrance pupil stops, images, exit pupil, etc. The four basic form system shown in Fig. 4 provides an erect, fully corrected image with no vignetting, with no objectionable aberrations, and provides a system which is still inverting but which is suitable for use in building a unit power erect periscope for general application as a two-stage erecting system. The four basic form system is inserted between an inverting system of objective and ocular. The insertion of the four basic forms maintains the intrinsic inversion. The length of a periscope may be extended by the use of 4, 6, 8, etc. basic forms. The system also is usable with both eyes.

A four basic form system may have, illustratively, a total length of 72 inches between entrance and exit pupils. Accommodation for an observer's nose and forehead may be accomplished by the omission of a metal stop at the exit pupil of such a system. Basic forms in tandem perform well and the symmetry of the entire system must be fully corrected for use at a conjugate distance relation of 1 to 1 or of infinity to 1 or the reverse. All intermediate distances must be well corrected also.

Where two basic forms are used as an erector, the circle of confusion on the axis from the 3.150 inch pupil of an experimental model was determined to be only 0.030 mm. in the second image plane. An object point on the first focal plane of this system was imaged on the second focal plane experimentally to a sharpness of 0.030 mm. Using a final eyepiece with an equivalent focal length of 6.102 inches, the circle of confusion was established as being 0.7 minute of arc, as error for a large pupil. The human eye has an entrance pupil of not to exceed one-third inch diameter, as a result of which it sees but a small fraction of what already is an unobservable angular error. Where the magnifying power of the system is increased, the exit pupil is decreased in size and more of the residual aberration enters the eye and in turn magnifies the error. The error has a maximum gradient in the outer 10% of the pupil, as shown by the curve in Fig. 5. The use of higher powers requires a better overall state of correction of the pupil where the original aberration is noticeable. The optical system which is disclosed herein has an axial aberration which is too small to be observable.

The disclosed system avoids sharp intermediate stops, as seen in image space, because the symmetrical errors are not corrected. In a four basic form system, if the entrance pupil or its first image is a real stop then the exit pupil will indeed be completely sharp. The field stop cannot have a fully sharp real image in image space but may appear as being moderately sharp but not fully black owing to the presence of strong coma. The coma at the eyepiece spreads the light rays from the edge of the field outward from the axis but not to an objectionably noticeable blurring extent because but a fraction of the error is apparent to the observer's eye. It is undesirable to have more than one real field stop since the image points at the rim of the field have coma at the real field stop and the observed field diameter will be greater at the edge than it is at the center of the pupil. The coma in the exit pupil thus amounts to a variation of distortion with position in the pupil. Spherical aberration in the image represents a variation of distortion of the chief ray independent of its position in the pupil. An exit pupil which is 3.15 inches in diameter permits an observer to move his head laterally about 8 inches without losing the field on at least one eye.

The design data in the above chart may be reduced in scale to one-third of the values stated to a double barreled periscope for binocular vision. In such a device the exit pupils are slightly more than one inch in diameter and their centers will be separated at approximately an average interpupillary distance. A resultant periscope of our basic forms would be 24 inches long. A periscope of eight basic forms would be 48 inches long, etc. The individual tube diameter may be less than 2.5 inches.

A system embodying two basic forms in a periscope requires that both the objective and the eyepiece use chief rays which are parallel to the optical axis at the focal plane. The disclosed system as an erector transmits a 31 degree field which may be materially enlarged with a decrease in the pupil dimensions and an altered symmetry. Such a device is within the conception of the present invention. In the event it is desirable that a large real field is to be transmitted by such a periscope, then the objective lens group is made of shorter focal length, such as with an objective of 3.051 inches, or one-half of that cited in the chart, then the real field is doubled to 62 degrees and the entrance pupil would be decreased to 1.575 inches in diameter or less as needed.

In using a smaller entrance pupil an improved correction of oblique spherical aberration and astigmatism is obtained by diminishing the distance between the basic forms as dictated by image positions. An eyepiece identical with the objective again produces unit power with an exit pupil which is 1.575 inches in diameter and a real field of 62 degrees. An eyepiece of shorter focal length maintains an apparent field of 62 degrees while the real field shrinks in inverse order with the power. The exit pupil also shrinks inversely with the power. In identical designs coma will cancel out at the eyepiece, irrespective of the focal lengths, as will also lateral colors. Distortion varies with the cube of the field angle and hence its omission from the observed image depends quite largely upon the eyepiece with its shorter focal length. Distortion is absent only at unit power and its control or its partial cancellation depends upon the proximity within a system of a conjugate distance relation of 1 to 1.

The experimental model made to demonstrate the present invention is characterized at unit power by a close approach to almost perfect sharpness, by an absence of any vignetting of the pupil, by sharpness of the exit pupil and by clarity of field.

The above described sighting instrument optical system may be adapted for photographic purposes with the final image plane necessarily real and outside of the system where it may be occupied by a matte glass or by an emulsion on a plate or on a film.

The system is applicable to visual adaptations with greater latitude than it is for photographic purposes, since for visual purposes the final image plane may be virtual and need not necessarily lie in a single flat plane because of the adaptability and the tolerances of the human eye.

Thus the photographic and the visual adaptations differ only in the final degree of excellence in flatness of field with the photographic use more critical to the correction of aberrations than is the visual use.

Modern types of aircraft may require a periscope for aiding the pilot in viewing the terrain below him. Preferred stipulations for such a periscope may be a small diameter tube of considerable length, with preferably a large entrance pupil, a large field, comfortable eye relief etc. and a periscope which may be of a more or less zig-zag construction. Requirements for a large field and a large pupil introduce higher order aberrations which may be out of all proportion to the small gains in field and in pupil.

The usual periscopic or telescopic system places unnecessary emphasis upon distinct field lens and objective lens groups. In the design of thin lens systems an achromatized objective forms a first image in a first focal plane. A field lens, which commonly is a simple or an achromatized thin lens, forms an image of the objective lens upon a succeeding objective lens, which in turn forms an image of the first focal plane and field lens upon a second focal plane and field lens. In this manner field lenses F in Figs. 3 and 4, and objective lenses O in Figs. 3 and 4, follow each other in the train of lenses. In such a system the lens elements have a considerable cumulative net positive power and add steadily to a positive Petzval sum of considerable magnitude and hence the end result in the final image plane is an image which may be objectionably curved.

All of the lens and the stop elements of an optical system may be viewed functionally as an equivalent system of successive stop images and focal planes. Each image of an entrance pupil lies to a first approximation in a plane with no mathematical thickness. Elements associated with the image of the entrance pupil may be regarded as an objective lens group, designated O at the extreme left of the system in Fig. 4. Elements associated with the field stop image or a focal plane, may be regarded as a field lens group, designated F in the system in Fig. 4. Since both the objective and the field groups partake to some extent of the function of the other, the groups overlap functionally.

In the system contemplated hereby, the space between successive focal planes contains elements which are arranged to correct objectionable aberrations. The system particularly corrects field curvature by flattening the field with negative lens surfaces near the stops which in effect form a flat final image.

Military installations may require optical systems which may be of greater or less length for particular installations. In the past optical systems commonly have been so inflexible that any change in the spacings between the elements, which commonly are lenses and stops, change the performance of the system. The present invention provides an optical insert which may be used alone or which may be repeated along a common axis a desired plurality of times within limits to provide an instrument of a required length with an assured dependable performance characterized by inappreciable aberrations in its final image.

Calculations indicate that for a favorably small Petzval sum, which is desirable, the separation of the focal plane from the stop image plane should lie between 1.5 and 4 times the equivalent focal length of the insert. Smaller values result in increased curvature of field and larger values prevent the correction of aberrations over large fields. There also exists a limit on the negative power which may be employed in the elements nearest the stops. Too much negative power for a given focal length reduces the available field transmitted and over-corrects field curvature. Too little negative power is insufficient in flattening the field. Any negative power used is an improvement over previous periscope optical systems. A limit on too much negative power is set conveniently by a slight over-correction. A slight over-correction is favorable in that it compensates eyepiece curvatures and residual curvatures in the first objective. It has been found by calculation that a suitable limit is set when the negative radius nearest the stop at either end of the system is greater in absolute value than 0.3 times the equivalent focal length of the basic unit length of one optical insert in the system. The limit on the other side is set with a concave surface.

The insert contemplated hereby is characterized by parallel chief rays in a beam across intermediate focal planes. The insert is advantageously symmetrical and is reversible where, as disclosed herein, it includes an initial field lens group designated F in Figure 3, an objective lens group designated O—O in Figure 3, and a final field lens group also designated F in Figure 3. Symmetry of construction is not required, however, between field lens and objective lens groups in the disclosed adaptations of the present invention. In the previously mentioned experimental model an optimum approach to enact symmetry in the elements of the system provides an apparent field of 30.71°. There was no vignetting of the pupil in the experimental model, even at the very edge of the assigned field, which is an extremely favorable but a rarely attained performance characteristic of sighting instruments.

It is to be understood that the three lenses which are disclosed and are defined herein together, and in association with other elements of the disclosed optical systems, have been assembled for particular installations which have been described and illustrated herein as successfully operative embodiments of the present invention. It is to be understood further that these same lenses, with their associated optical elements, may be proportionally increased or decreased in size and may be rearranged for accomplishing adaptations and installations which are modifications of those disclosed herein without departing from the spirit and the scope of the present invention.

I claim:

1. An optical system, comprising a lens group of three lenses assembled in consecutive sequential order of arrangement within an instrument tube and on a common axis as a double compound divergent lens and a convergent lens in the mutual relationship of continuously conducting a light beam through all three lenses in the group and with each lens modifying the light beam distinctively as the light beam passes through each such lens, the three lenses having the following relative surface dimensions as determining the true lens dimensions, a first lens first surface curvature of a radius of 2.637 inches, a first lens second surface curvature of a radius of 8.639 inches and of opposite sign to that of the first lens first surface curvature, a second lens first surface curvature of a radius of 8.639 inches and of a curvature sign which is opposite to that of the first lens first surface curvature, a second lens second surface curvature of a radius of 4.031 inches and of the same curvature sign as the first lens first surface curvature, and a third lens first surface curvature of a radius of 24.768 inches and of opposite curvature sign as the first lens first surface curvature, and a third lens second surface curvature of a radius of 9.967 inches and of the same curvature sign as the first lens first surface curvature.

2. The lens group defined in the above claim 1, wherein the second lens second surface and the third lens first surface are separated at their vertices a distance of 0.145 inch.

3. The optical system defined in the above claim 2, wherein two sets of the group of three lenses each are positioned along a common axis in mirror image relation with each other.

4. The optical system defined in the above claim 3, wherein the two sets of three lenses each are separated an axial distance of 8.416 inches with required mounting allowances.

5. The optical system defined in the above claim 3, with a light beam periphery defining stop positioned adjacent the first lens first surface at an end of the system.

6. The optical system defined in the above claim 5, with the plane of the stop positioned 1.502 inches from the first lens first surface at its vertex.

7. The optical system defined in the above claim 3, with a light beam periphery defining stop positioned adjacent the first lens first surface at both ends of the system.

8. The optical system defined in the above claim 7, wherein third and fourth duplicates of the first lens are positioned respectively upon the opposite side of each stop and equidistant axially from the first lens adjacent surface and of opposite curvature sense thereto.

9. An optical system having the following characteristics:

[Focal length 6.102 inches for overall length of 18.000 inches. f/1.935. Field 30.71 degrees.]

| Surface | Radius (inches) | Thickness | | Glass Type | Edged Diameter (inches) |
|---|---|---|---|---|---|
| | | Glass | Air | | |
| (1) | −2.637 | 0.351 | | DF-2 | 5.700 |
| (2) | 8.639 | 1.942 | | DBC-3 | 5.700 |
| (3) | −4.031 | | 0.145 | | |
| (4) | 24.768 | 0.852 | | DBC-3 | 6.400 |
| (5) | −9.967 | | 8.416 | | |
| (6) | 9.967 | 0.852 | | DBC-3 | 6.400 |
| (7) | −24.768 | | 0.145 | | |
| (8) | 4.031 | 1.942 | | DBC-3 | 5.700 |
| (9) | −8.639 | 0.351 | | DF-2 | 5.700 |
| (10) | 2.637 | | 1.502 | | |

10. An optical system basic form of six lens elements in mirror groups of three lens elements each, comprising a first lens group of three lenses assembled within a tube to conduct light energy in sequential order through all of the lenses as a doublet compound lens and a single lens on a common axis of true lens dimensions which is a factor of the following lens surface dimensions and spacings, the first lens first surface of a curvature of radius 2.637 inches, a first lens second surface of a curvature of radius 8.639 inches and of a curvature sign opposite to that of the first lens first surface, a second lens first surface of a curvature of radius 8.639 inches and with the same curvature as and bonded substantially throughout its area to the first lens second surface, a second lens second surface of a curvature of radius 4.031 inches and of a curvature sign opposite to that of the second lens first surface, a third lens first surface of a curvature of 24.768 inches and of opposite curvature sign to that of the second lens second surface and air spaced 0.145 inch therefrom along the axis of the lens assembly, a third lens second surface of a curvature of 9.967 inches and of the same curvature sign as the first lens first surface, and a second lens group in mirror image of the first lens group and on the same common axis therewith and spaced 8,416 inches therefrom along the axis common to both groups of lenses.

11. An optical system insert comprising twelve lens elements conducting light energy in sequential order through all of the lenses arranged in two basic forms of six lens elements each and with each of the basic forms consisting of six lenses in mirror groups of three lens elements each, a tube within which all twelve of the lenses are aligned on a common axis, each of the lens mirror groups consisting of a doublet compound lens and a single lens on the axis common to all of the lenses and of lens dimensions and lens spacings such that the first lens first surface is of a curvature of radius 2.637 inches, the first lens second surface is of a curvature of radius 8.639 inches and of a curvature sign opposite to that of the first lens first surface, a second lens first surface of a curvature of radius 8.639 inches and with the same curvature as and bonded substantially throughout its area to the first lens second surface, a second lens second surface of a curvature of radius 4.031 inches and of a curvature sign opposite to that of the second lens first surface, a third lens first surface of a curvature of 24.768 inches and of opposite curvature sign to that of the second lens second surface and air spaced 0.145 inch therefrom along the axis of the lens assembly, a third lens second surface of a curvature of 9.967 inches and of the same curvature sign as the first lens first surface, and a second lens group of three lenses arranged in mirror image of the arrangement of the first lens group of three lenses in each of the basic forms and on the same common axis therewith and the second lens group spaced 8.416 inches from the first lens group along the axis common to all of the lenses, a second basic form duplicate of the first basic form on the same axis therewith and spaced an axial distance of 1.502 inches therefrom.

References Cited in the file of this patent

UNITED STATES PATENTS

| | | |
|---|---|---|
| 2,130,760 | Warmisham | Sept. 20, 1938 |
| 2,239,469 | Reason | Apr. 22, 1941 |
| 2,430,549 | Altman | Nov. 11, 1947 |
| 2,453,336 | Orser | Nov. 9, 1948 |
| 2,571,308 | Taylor | Oct. 16, 1951 |

FOREIGN PATENTS

| | | |
|---|---|---|
| 439,556 | Germany | Jan. 13, 1927 |

UNITED STATES PATENT OFFICE
CERTIFICATE OF CORRECTION

Patent No. 2,899,862                                August 18, 1959

James G. Baker

It is hereby certified that error appears in the printed specification of the above numbered patent requiring correction and that the said Letters Patent should read as corrected below.

Column 1, line 36, for "near" read -- nearer --; column 5, line 13, for "designation" read -- designations --; column 6, line 25, for "our" read -- four --; column 8, line 43, for "double" read -- doublet --.

Signed and sealed this 1st day of March 1960.

(SEAL)
Attest:

KARL H. AXLINE
Attesting Officer

ROBERT C. WATSON
Commissioner of Patents